US008205110B2

(12) United States Patent
Petrick

(10) Patent No.: US 8,205,110 B2
(45) Date of Patent: Jun. 19, 2012

(54) SYNCHRONOUS OPERATION OF A SYSTEM WITH ASYNCHRONOUS CLOCK DOMAINS

(75) Inventor: Bruce Petrick, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 757 days.

(21) Appl. No.: 12/264,073

(22) Filed: Nov. 3, 2008

(65) Prior Publication Data

US 2010/0115322 A1 May 6, 2010

(51) Int. Cl.
*G06F 15/16* (2006.01)
*G06F 1/00* (2006.01)
*G01R 31/28* (2006.01)

(52) U.S. Cl. .................... 713/375; 713/500; 714/731

(58) Field of Classification Search ............... 713/375, 713/500; 714/731
See application file for complete search history.

(56) References Cited

U.S. PATENT DOCUMENTS

| | | | | |
|---|---|---|---|---|
| 5,811,987 A * | 9/1998 | Ashmore et al. | ............... | 326/39 |
| 6,131,173 A * | 10/2000 | Meirlevede et al. | ........... | 714/726 |
| 6,172,540 B1 * | 1/2001 | Gandhi | ........................ | 327/145 |
| 6,782,064 B1 * | 8/2004 | Schwake | ..................... | 375/354 |
| 6,799,280 B1 * | 9/2004 | Edenfield et al. | ............ | 713/400 |
| 7,043,654 B2 * | 5/2006 | Khondker et al. | ............ | 713/500 |
| 7,492,793 B2 * | 2/2009 | Chelstrom et al. | ............ | 370/503 |
| 7,768,325 B2 * | 8/2010 | Milton | ........................ | 327/144 |
| 7,899,955 B2 * | 3/2011 | Gruijl | ............................. | 710/35 |
| 2004/0221208 A1 * | 11/2004 | Floyd et al. | ..................... | 714/50 |
| 2004/0225977 A1 * | 11/2004 | Akkerman | ........................ | 716/6 |
| 2008/0069278 A1 * | 3/2008 | Baumgartner et al. | ....... | 375/354 |
| 2008/0201499 A1 * | 8/2008 | Gruijl | ............................. | 710/35 |
| 2009/0271651 A1 * | 10/2009 | Pothireddy et al. | .......... | 713/400 |
| 2010/0011264 A1 * | 1/2010 | Pugliesi-Conti et al. | ..... | 714/731 |
| 2010/0111154 A1 * | 5/2010 | Kelleher et al. | ............... | 375/226 |

OTHER PUBLICATIONS

Clifford E. Cummings and Peter Alfke, Simulation and Synthesis Techniques for Asynchronous FIFO Design with Asynchronous Pointer Comparisons, Apr. 19, 2002, 18 pages.
Clifford E. Cummings, Simulation and Synthesis Techniques for Asynchronous FIFO Design, exact date unknown, published in 2002, 23 pages.
Arjun Rajagopal, Clock Tree Design for Robust Low Power Design, exact date unknown, published in 2006, 23 pages, Texas Instruments.

* cited by examiner

*Primary Examiner* — Paul R Myers
*Assistant Examiner* — Christopher a Daley
(74) *Attorney, Agent, or Firm* — Polsinelli Shughart PC

(57) ABSTRACT

A system may be employed for allowing the synchronous operation of an asynchronous system. The system may be a system that may include multiple clusters. The clusters may include asynchronous clock domains and may also receive a global clock signal through a global clock grid that may overlay the system. Furthermore, a method may be employed for synchronizing asynchronous clock domains within a cluster. The method of synchronizing may include providing a global clock that corresponds to a global clock grid to each cluster. Additionally, the method of synchronizing may include accounting for the mismatch between the asynchronous clock domains by employing logic in a block.

16 Claims, 8 Drawing Sheets

SYNCHRONOUS OPERATION OF A SYSTEM WITH ASYNCHRONOUS CLOCK DOMAINS

FIELD OF THE INVENTION

The present invention generally relates to the operation and/or testing of processors and more specifically to the synchronous operation and/or testing of processors with asynchronous clock domains.

BACKGROUND

Computing systems may include multiple processors with asynchronous interfaces between clusters. The clusters may operate asynchronously from one another and may have multiple asynchronous clock domains. In testing the processors, it may be desirable to test the asynchronous interfaces between the clusters, in a synchronous mode, with cycle by cycle accuracy. Thus, testing the processors may require the matching and/or aligning of multiple asynchronous clock domains. Typically, the alignment may take place at the pin boundaries of the system (where the pins may be located at the perimeter of the system).

When testing the clusters that are internal to the system, the test often requires cycle by cycle accuracy and accordingly, aligning the clocks at the pin boundaries. However, it may be difficult to align the clocks at the pin boundaries with cycle by cycle accuracy. Thus, a method of internally aligning multiple asynchronous clock domains is desirable. Accordingly, there is a need in the art for an improved method for allowing the synchronous operation of a system with multiple asynchronous clock domains.

SUMMARY

Generally, one aspect of the present disclosure involves an electronic circuit. The electronic system may comprise a first set of logic blocks, wherein the logic blocks include asynchronous clock domains, a global clock providing a global clock signal and a global clock routing mechanism. The global clock routing mechanism may correspond to the global clock and may overlay the electronic system. The global clock routing mechanism may provide the global clock signal to each of the logic blocks of the first set of logic blocks of the electronic system and the global clock routing mechanism may be configured to provide a substantially matched global clock signal to each logic block of the first set of logic blocks. The electronic system may include a first header which may correspond to a first logic block of the first set of logic blocks and which may receive a first clock signal and the global clock signal. The electronic system may also include a second header which may correspond to a second logic block of the first set of logic blocks and which may receive the first clock signal and the global clock signal. The first logic block and the second logic block of the first set of logic blocks may be matched. Additionally, the electronic system may include a set of headers, where each of the logic blocks of the first set of logic blocks may have at least one corresponding header and the global clock signal may be provided to each header. The electronic system may include a plurality of clocks provided to each header of the set of headers and may further include a plurality of output clocks where each output clock may be provided by a corresponding header of the set of headers.

In one embodiment, the global clock routing mechanism may be a clock grid. The electronic system may include a plurality of clock grids, each of the plurality of clock grids corresponding to individual logic blocks of the first set of logic blocks. The electronic system may also include a plurality of clock routing mechanisms where each of the plurality of clock routing mechanisms may correspond on a one to one basis to individual output clocks of the plurality of output clocks. Additionally, the electronic system may include a plurality of synchronizing logic blocks which may be inserted between at least two clock grids of the plurality of clock routing mechanisms, where the two clock routing mechanisms may be in the same logic block of the first set of logic blocks. A logic block of the first set of logic blocks may include at least two headers of the set of headers, where the two headers may correspond to two clock routing mechanisms that may be mismatched. The global clock routing mechanism may be transmission lines that connect the global clock to each logic block of the first set of logic blocks. The transmission lines of the global clock routing mechanism may be configured to provide a matched global clock signal to each logic block of the first set of logic blocks. The electronic system may include a delay in the global clock signal between the global clock and a logic block of the first set of logic blocks, where the delay may be less than half the period of a fastest clock signal of the electronic system. Additionally, the electronic system may include a first clock routing mechanism of the first logic block of the first set of logic blocks and a second clock routing mechanism of the second logic block of the first set of logic blocks, where the first clock routing mechanism and the second clock routing mechanism may be matched.

In yet another embodiment, the present invention may take the form of a method for synchronously transmitting data in a system with asynchronous clock domains. Two logic blocks and a global clock may be provided where the global clock may correspond to a global clock signal and a global clock routing mechanism. The global clock signal may be provided to the at least two logic blocks and the global clock routing mechanism may have transmission lines that provide substantially matched global clock signals to the at least two logic blocks. One or more logic block headers may receive at least the global clock signal and an additional clock signal. The one or more logic block headers may provide at least two output clock signals corresponding to at least two output clock routing mechanisms. In one embodiment, each logic block header may provide a corresponding output clock signal. A block of logic may be provided between the at least two output clock routing mechanisms and may synchronously transmit data between the at least two logic blocks. Additionally, the at least two output clock signals may be different frequencies from one another. Also, a first logic block header of a first logic block may receive a first clock signal and the global clock signal and a second logic block header of a second logic block may receive the first clock signal and the global clock signal.

In still another embodiment, the present invention may take the form of a method of synchronously operating asynchronous logic blocks. A first value of a first clock may be provided and may allow a data value to change in a first element. The data value may be transmitted to a second element. The data value may be held on the output of the second element when the first clock provides a second value of the first clock and the data value may be allowed to change in a read flip-flop on a rising edge of a second clock. In one embodiment, the first clock may be a write clock and the second clock may be a read clock. Additionally, the second value of the first clock may be low and the second element may be a latch. The data value of the first element may change on a rising edge of the first clock where the first element is a flip-flop.

These and other advantages and features of the present invention will become apparent to those of ordinary skill in the art upon reading this disclosure in its entirety.

DETAILED DESCRIPTION OF EMBODIMENTS

Figure 1A:
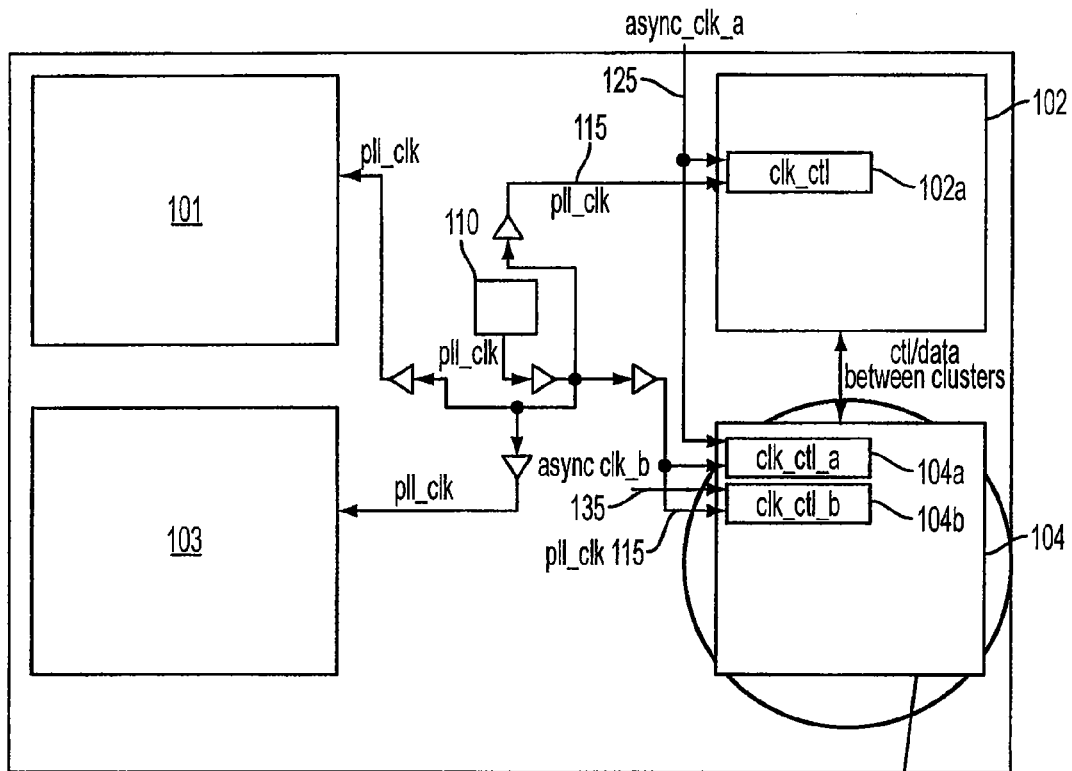
FIG. 1A depicts an embodiment of a generic system with asynchronous clusters and asynchronous clock domains.

Generally, one aspect of the present invention may include a system that may be configured for synchronous operation and/or testing where the system may include multiple asynchronous clock domains. The system may include a global clock grid and multiple clusters. The global clock grid may overlay the system, may correspond to a global clock and may enable the transmission of a global clock signal to each of the clusters included in the system. Generally, the global clock configuration may be referred to as a global clock tree or a global clock grid and the two terms may be used interchangeably herein. The global clock grid may allow the transmission of a global, aligned clock signal between the clusters and across the system. Each of the clusters may have at least one cluster header and the global clock may be connected to each of the clusters through its corresponding cluster header(s). Each individual cluster and cluster header may also receive a local, and possibly, asynchronous clock signal in addition to the global clock signal. Each individual cluster header may output another clock signal that corresponds to a local clock grid for the cluster. Further, the clusters may have more than one local clock grid and the clock grids may be mismatched. A logic block may be inserted between the mismatched clock grids for at least the purpose of synchronizing the signals and/or data between the clock grids. The logic block may ensure that data is correctly transmitted between clusters and from a write side of the logic block to a read side of the logic block.

Another embodiment of the present invention may take the form of a method for allowing the synchronous operation of a system with multiple asynchronous clock domains. In this method, a data value may pass to a flip-flop and the data value may change in the flip-flop when a first clock signal, such as a write clock signal, is high. Continuing the description of this embodiment, the data value may be held in an element such as a latch while the write clock is high and then may be allowed to pass through the element on the falling edge of the write clock or when the write clock is low. The data value may then be passed to a second flip-flop on the rising edge of the read clock. Thus, the data value may be appropriately aligned with the read clock. Once the data value is allowed to pass to the input of the second flip-flop, the data value may change values in the flip-flop on the next rising edge of the read clock.

It should be noted that embodiments of the present invention may be used in a variety of chips or asynchronous systems including local systems, servers, development environments and so on. The embodiment may include a variety of computing systems, processors, cores, integrated circuits, logic circuits, system on a chip and any electrical system that may include timing mechanisms such as clocks. Aspects of the present invention may be used with practically any method or apparatus related to processing systems, computing systems, cores, processors, circuits, systems on a chip and chips that may employ any type of asynchronous or synchronous signals. Accordingly, embodiments of the present invention may be employed in computers, local systems, processors, any type of system on a chip, integrated circuits, application specific integrated circuits, electrical systems with timing mechanisms and so on.

Before explaining the disclosed embodiments in detail, it is to be understood that the invention is not limited in its application to the details of the particular arrangements shown, because the invention is capable of other embodiments. Also, the terminology used herein is for the purpose of description and not intended to limit the claims.

FIG. 1A is a representation of a generic system including clusters with asynchronous clock domains. Generally speaking, the term "clusters" may refer to a block of logic performing a specified function. The generic system may be any type of system including a processor, a logic circuit, a system on a chip and so on. The generic system of FIG. 1A includes cluster 101, cluster 102, cluster 103, cluster 104 and a phase locked loop 110 ("PLL") that may output a global clock signal 115 (pll_clk), to each of the clusters 101, 102, 103, 104. The global clock signal 115 (pll_clk) may be transmitted to the clusters by a global clock grid (not shown in FIGS. 1A and 1B) where the global clock grid or global clock tree may overlay the system. As mentioned previously, the global clock configuration may be referred to as a global clock tree or a global clock grid and the two terms may be used interchangeably herein. The clock grids disclosed herein may include one or more networks of metal, wires, transmission lines, branches and so forth, where the grids may overlay a system and convey one or more timing signals. In some embodiments, the grids may include optical networks conveying timing signals. Furthermore, the transmission lines of the global clock grid may be designed such that the global clock signal 115 (pll_clk) may be transmitted synchronously to each of the clusters.

The global clock signal 115 (pll_clk) may be provided by a global clock and may originate from the common starting point of the PLL 110. Additionally, the global clock signal 115 (pll_clk) may be routed in a global clock tree. The terms "global clock grid" and "global clock tree" may be used interchangeably herein. The global clock tree may be routed such that the distance from the common starting point of the PLL 110 to each of the clusters, may be similar in length. This distance may be referred to herein as a "branch." Generally, the branch lengths may be similar enough so that the clock signal provided by the PLL to the cluster may be matched or so that any clock signal mismatches between clusters may be compensated for by employing and/or matching loads and buffers. Various types of delay elements may be used to account for clock signal mismatches, hold time violations and so on. The delay elements may be inverters, buffers, stacked inverters, transistors, capacitively coupled wires and so on. By maintaining similar length branches in the global clock tree, the global clock signal 115 (pll_clk) may be closely matched at the clusters, thus ensuring that the delay elements and loads are also matched. The global clock grid will be discussed in further detail below.

As depicted in FIG. 1A, clusters may have any number of cluster headers or clock controls that may receive clock signals. For example, as shown in FIG. 1A, cluster 102 may have a cluster header 102a (clk_ctl_a) that may receive the global clock signal 115 (pll_clk) and a local asynchronous clock signal 125 (async_clk_a). Also shown in FIG. 1A, cluster 104 may include cluster headers 104a (clk_ctl_a) and 104b (clk_ctl_b). Cluster header 104a (clk_ctl_a) may receive the clock signal 115 (pll_clk) and the clock signal 125 (async_clk_a). Further, cluster 104 may include a cluster header 104b (clk_ctl_b) which may receive the global clock signal 115 (pll_clk) and a local asynchronous clock signal 135 (async_clk_b). Generally, the local clock signals may be employed while the clusters operate in asynchronous mode and the global clock signal 115 (pll_clk) may be employed while the clusters operate in synchronous mode.

In FIG. 1A, cluster 102 may operate asynchronously with respect to cluster 104. Generally, clusters that operate asynchronously with respect to one another may receive clock signals that may not be aligned and/or matched. The terms "aligned" and "matched" may be used interchangeably herein. The term mismatched as used herein may refer to two or more signals that are mismatched in terms of frequency and/or phase or two or more signals that are skewed with respect to each other. Further, clock signals that are not aligned may have falling edges and/or rising edges that do not occur at the same time as one another. Additionally, each of the clusters 101, 102, 103, 104 may include multiple clock domains which may operate asynchronously with respect to each other or even with respect to themselves. For example, a first local clock signal corresponding to cluster 102 may not be aligned and/or matched to a second local clock signal corresponding to cluster 104. In another example, the first local clock signal corresponding to cluster 102 may not be aligned and/or matched to the second local clock signal also corresponding to cluster 102

As depicted in FIG. 1A, the cluster header 102a of cluster 102 and the cluster header 104a of cluster 104 may receive the same clock signals. Accordingly, at least one clock domain of cluster 104 may be synchronized with the clock domain of cluster 102, thus allowing the synchronous transmission of data from cluster 102 to cluster 104. Additionally, the asynchronous clock signal may be locally aligned between cluster 102 and cluster 104, but need not be aligned globally across the system. In one example, the cluster header 102a of cluster 102 and the cluster header 104a of cluster 104 may both receive the global clock signal 115 (pll_clk) and the asynchronous clock signal 125 (async_clk_a). Additionally, the cluster headers 102a and 104a may both output a clock signal, where the clock signal may be the same clock signal. The clock signal output by the cluster headers will be discussed in more detail below with respect to FIG. 1A.

In one embodiment, cluster 102 may transfer data to cluster 104. Generally, clusters may employ their respective local asynchronous clocks when functioning in asynchronous mode and the global clock when functioning in synchronous mode. Because cluster 104 and cluster 102 both receive the asynchronous local clock signal 125 (async_clk_a) and the global clock signal 115 (pll_clk) the transfer of data from cluster 102 to cluster 104 may be synchronous. Stated differently, the asynchronous clock signal 125 (async_clk_a) and the global clock signal 115 (pll_clk) provided to both cluster 102 and cluster 104 may be matched clock signals, thus the data transfer from cluster 102 to cluster 104 may be synchronized.

Figure 1B:
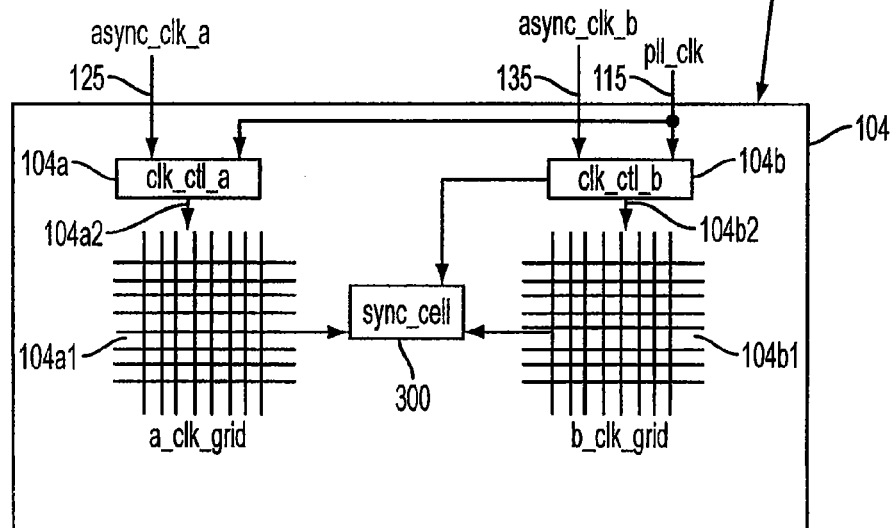
FIG. 1B depicts a representation of a deconstructed cluster with two asynchronous clock domains.

In FIG. 1B, cluster 104 includes two cluster headers 104a (clk_ctl_a) and 104b (clk_ctl_b). Additionally, cluster header 104a (clk_ctl_a) may correspond to a first clock grid 104a1 (a_clk_grid) and cluster header 104b (clk_ctl_b) may correspond to a second clock grid 104b1 (b_clk_grid). Further, cluster 104 may include two asynchronous clock domains, thus the first and second clock grids within cluster 104 may be mismatched. The clock grids and asynchronous clock domains will be discussed in further detail below.

FIG. 1B depicts one representation of a deconstructed cluster 104. As shown in FIG. 1B, cluster 104 may have two cluster headers, 104a (clk_ctl_a) and 104b (clk_ctl_b). Generally, the cluster headers may receive the clock signals for the cluster and each of the cluster headers may correspond to a clock grid or clock tree. Various types of routing mechanisms may be used such as a clock grid, clock tree and so on. The routing mechanism may provide clock signals to the flip-flops that may be aligned within ½ cycle of the fastest clock.

Additionally, the cluster headers may provide the clock signal to the corresponding clock grid. For example, in FIG. 1B, the cluster header 104a (clk_ctl_a) of cluster 104 may provide a local clock signal 104a2 that corresponds to a clock grid 104a1 (a_clk_grid). Further, the cluster header 104b (clk_ctl_b) of cluster 104 may provide a local clock signal 104b2 that corresponds to a clock grid 104b1 (b_clk_grid). The clock grids 104a1 (a_clk_grid) and 104b1 (b_clk_grid) may both overlay cluster 104. The clock grids will be discussed in further detail below. As depicted in FIG. 1B, both cluster headers 104a (clk_ctl_a) and 104b (clk_ctl_b) may receive the global clock signal 115 (pll_clk) from the PLL 110. In FIGS. 1A and 1B, the global clock signal 115 (pll_clk) may correspond to the global clock signal distributed to all the clusters in the system.

Also shown in FIG. 1B, cluster 104 may have two asynchronous clock domains that correspond to the two clock grids, 104a1 (a_clk_grid) and 104b1 (b_clk_grid). In one example, although the data transfer between cluster 102 and cluster 104 may be synchronized, the two asynchronous local clock signals 125 (async_clk_a) and 135 (async_clk_b) provided to cluster 104 might be mismatched. The asynchronous clock domains may be synchronized using a logic block referred to herein as sync_cell 300, which may be inserted between the two clock grids 104a1 (a_clk_grid) and 104b1 (b_clk_grid). The sync_cell 300 will be discussed in further detail below. By using the sync_cell 300, the asynchronous clock domains of cluster 104 may run in synchronous mode for the general operation and/or testing of the system.

Figure 2:
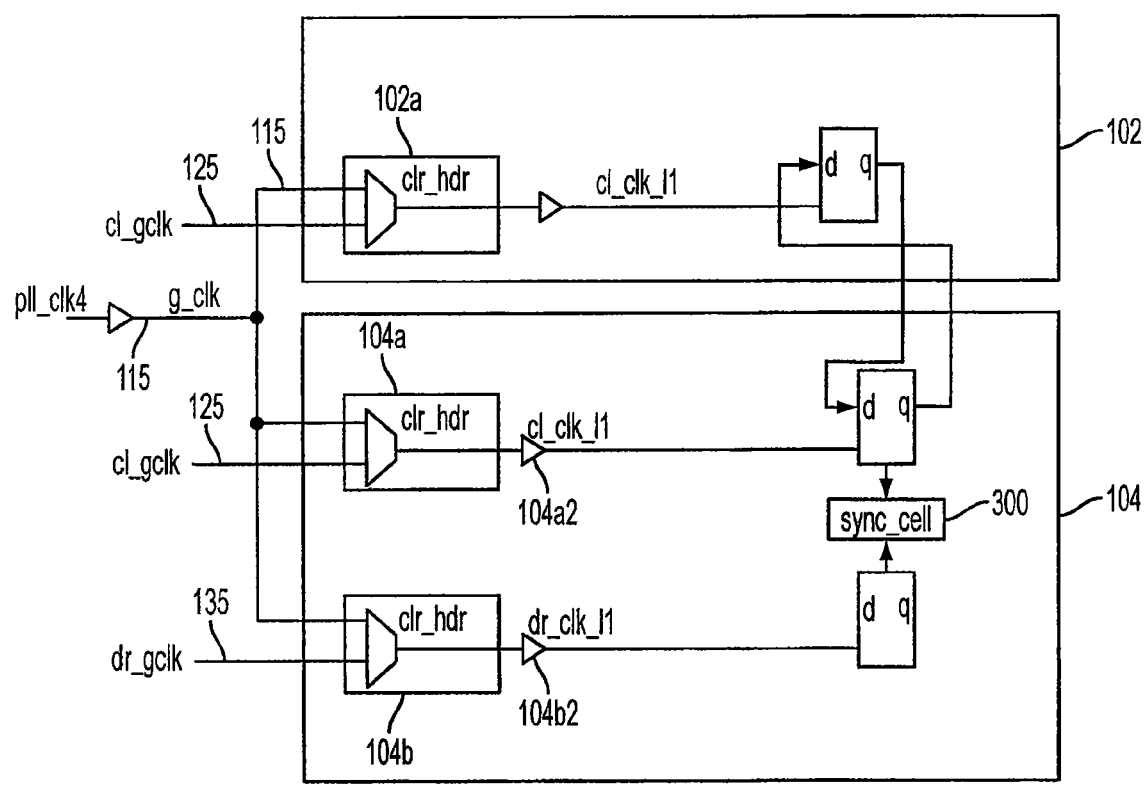
FIG. 2 depicts an exploded view of two logic blocks with multiple cluster headers

FIG. 2 illustrates two clusters where data may be synchronously transmitted from cluster 102 to cluster 104 via the flip-flops located in each of cluster 102 and cluster 104. Within cluster 104, the output clock signals from cluster headers 104a and 104b may be aligned between the two flip-flops (also located in cluster 104) by employing a synchronizing block of logic, sync_cell 300. As shown in FIG. 2, clusters 102 and 104 may have one or more cluster headers that may receive multiple clock signals. For example, as depicted in FIG. 2, cluster 102 may have one cluster header 102a and cluster 104 may have two cluster headers 104a and 104b. In FIG. 2, both cluster header 102a of cluster 102 and cluster header 104a of cluster 104 may receive the same input clock signals as one another such as the global clock signal 115 (pll_clk) and a clock signal 125 (async_clk_a). The clock signal 125 (async_clk_a) may be provided by a first local clock (not shown in FIG. 2). Accordingly, cluster 102 and 104 may operate synchronously with one another. As mentioned previously, cluster 104 may have a second cluster header 104b. The cluster header 104b of cluster 104 may receive the global clock signal 115 (pll_clk) and a clock 135 (async_clk_b) which may be a signal from a second local clock (also not shown in FIG. 2).

Further, as illustrated in FIG. 2, data may be communicated from cluster 102 to cluster 104. The data transfer may employ the local clock signal 125 from each of the first cluster headers in clusters 102 and 104, thus providing a matched clock signal between cluster 102 and cluster 104. Accordingly, in this example of FIG. 2, the timing of cluster 102 may be aligned with respect to cluster 104.

Moreover, in FIG. 2, the first cluster header 104a and the second cluster header 104b of cluster 104 may provide two clock signals 104a2 and 104b2, that may be mismatched. The first clock signal associated with the first cluster header 104a may be on one clock grid 104a1 and the second clock signal 104b2 may be associated with a second clock grid 104b1. The two separate grids may be mismatched with respect to one another. In synchronous mode, the mismatch in the two clock signals may be accounted for by employing a synchronizing block of logic, sync_cell 300. The sync_cell 300 will be discussed in further detail below.

Figure 3:
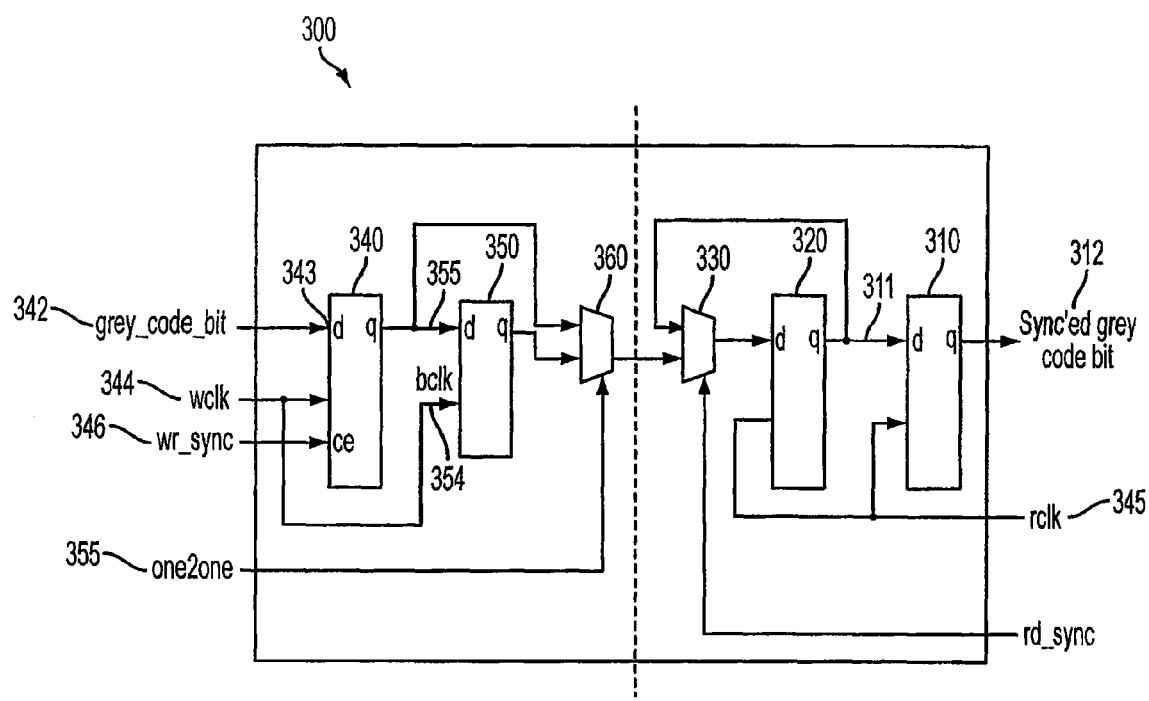
FIG. 3 depicts an embodiment of a synchronizing logic block diagram.

FIG. 3 depicts an embodiment of a logic block diagram of a sync_cell 300 that may function as a synchronizer. The sync_cell 300 may be included within a sync_block. Additionally, the configuration of elements within the sync_cell 300 is provided for explanatory purposes only. In one example, the sync_cell 300 of FIG. 3 may connect to a write grid and a read grid that may be mismatched and may have asynchronous clock domains. Additionally, the sync_cell 300 may connect to a clock grid that overlays a cluster, a clock grid that overlays all the logic in a particular clock domain and so on.

As shown and for explanatory purposes only, the write grid may be located on the left side of the block diagram (to the left of the dotted line in FIG. 3). Similarly, the read grid may be located on the right side of the block diagram (to the right of the dotted line in FIG. 3). The read side of the sync_cell 300 may include at least two back-to-back flip-flops 310, 320 (a first read flip-flop 310 and a second read flip-flop 320) and a read multiplexer 330. Generally, the read side of the sync_cell 300 may function as a synchronizer for aligning and/or insuring the synchronization of the asynchronous clock domain of the write side with the asynchronous clock domain of the read side. The write side of the sync_cell 300 may include a write flip-flop 340, a write b-latch 350 and a write multiplexer 360. The write flip-flop 340 may receive a data input 342 (grey_code_bit) on an input 343 (d). The write flip-flop 340 may also receive a clock signal 344 (wclk) and a sync signal 346 (wr_sync) as inputs. Generally, the b-latch may be a component that is transparent when the clock signal is low and "captures" the input and holds the clock signal on the output when the clock signal is high.

In FIG. 3, the b-latch 350 may delay a data value from being transmitted from the write side to the read side of the sync_cell 300. The delay provided by the b-latch 350 may allow the mismatched clock domains of the write grid and the read grid to transmit data synchronously. For example, in conventional systems that do not employ the b-latch 350, a grey_code_bit may be received on the input of the write flip-flop 340, the data may pass unhindered to the read flip-flop 320. (Generally, grey code is a binary system in which two successive values may only differ by one digit.) In the case of no b-latch 350, the data may be passed on the same read clock signal 345 (rclk) or the same cycle as the write clock signal 344 (wclk) instead of one cycle later. Thus, when the data passes from the write side to the read side of the sync_cell 300, the timing between the write clock and the read clock may be incorrect and the data will be incorrectly transmitted and/or timed. Although the discussion herein employs a b-latch, this is done for explanatory purposes only as other components may be used.

Figure 4A:
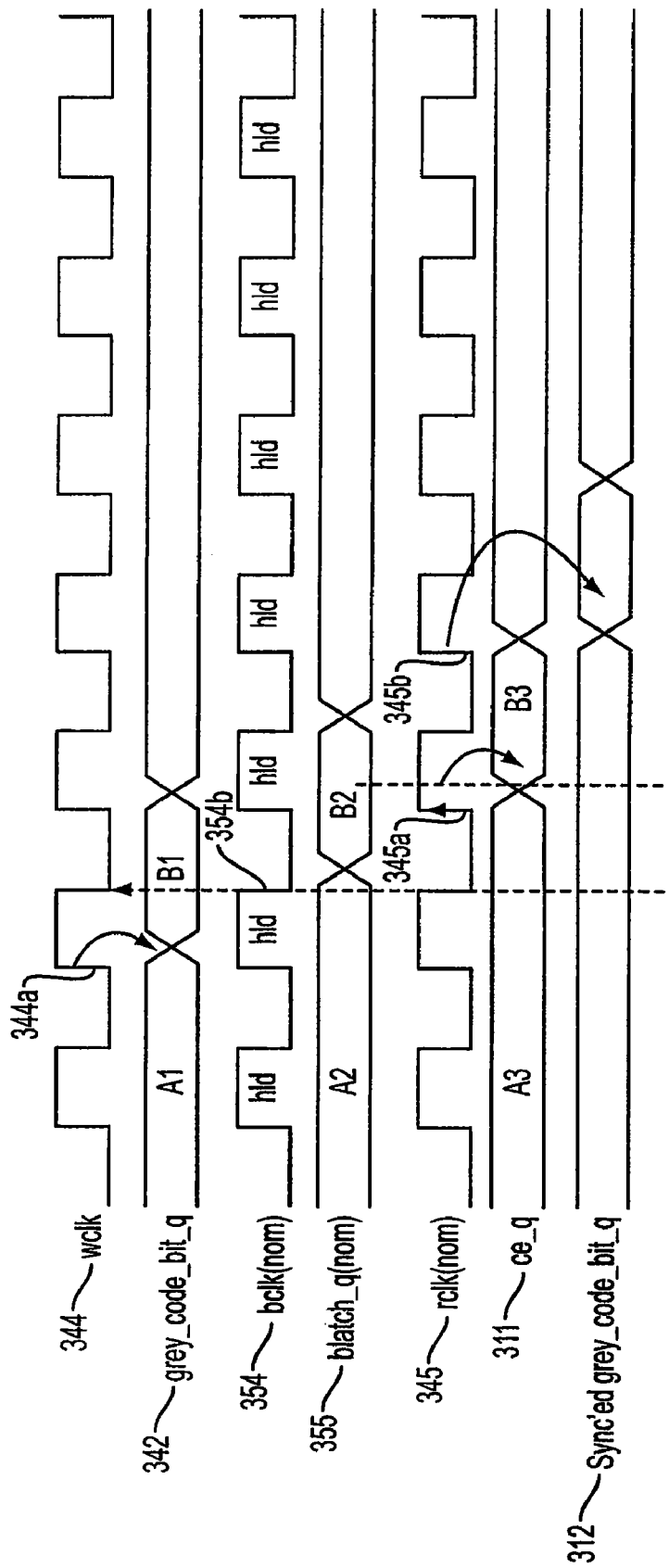
FIG. 4A is a timing diagram illustrating one possible timing relationship between the write clock and the read clock.

Reference may be made to FIG. 3 in conjunction with FIG. 4A which illustrates the timing between the clock signals and elements of FIG. 3. As shown in FIG. 3, the b-latch 350 and the write flip-flop 340 may receive the same input clock signal 344, thus the b-latch clock signal 354 (bclk) may be aligned with the write clock signal 344 (wclk). FIG. 4A is a timing diagram illustrating operation of the sync_cell 300.

Referring to FIG. 4A in conjunction with FIG. 3, the write flip-flop 340 may not change data values until the write clock signal 344 (wclk) is high or on a rising edge (such as rising edge 344a of FIG. 4A) of the write clock signal 344 (wclk). Further, the write b-latch 350 may be transparent when the b-latch clock signal 354 (bclk) is low and thus, may pass the data value to the write multiplexer 360. Additionally, the b-latch 350 may hold the previous data value and/or prevent the data value from changing when the b-latch clock signal 354 (bclk) is high. The timing of the data values with respect to the read and write clock signals will be discussed in further detail below with respect to the timing diagrams. Moreover, the elements of FIG. 3 have been described with respect to high and low clock signals, however the state of the clock signals are used for explanatory purposes only and may allow data to switch, pass and so forth, on a high or low clock signal depending on the configuration of the elements of FIG. 3.

Figure 4B:
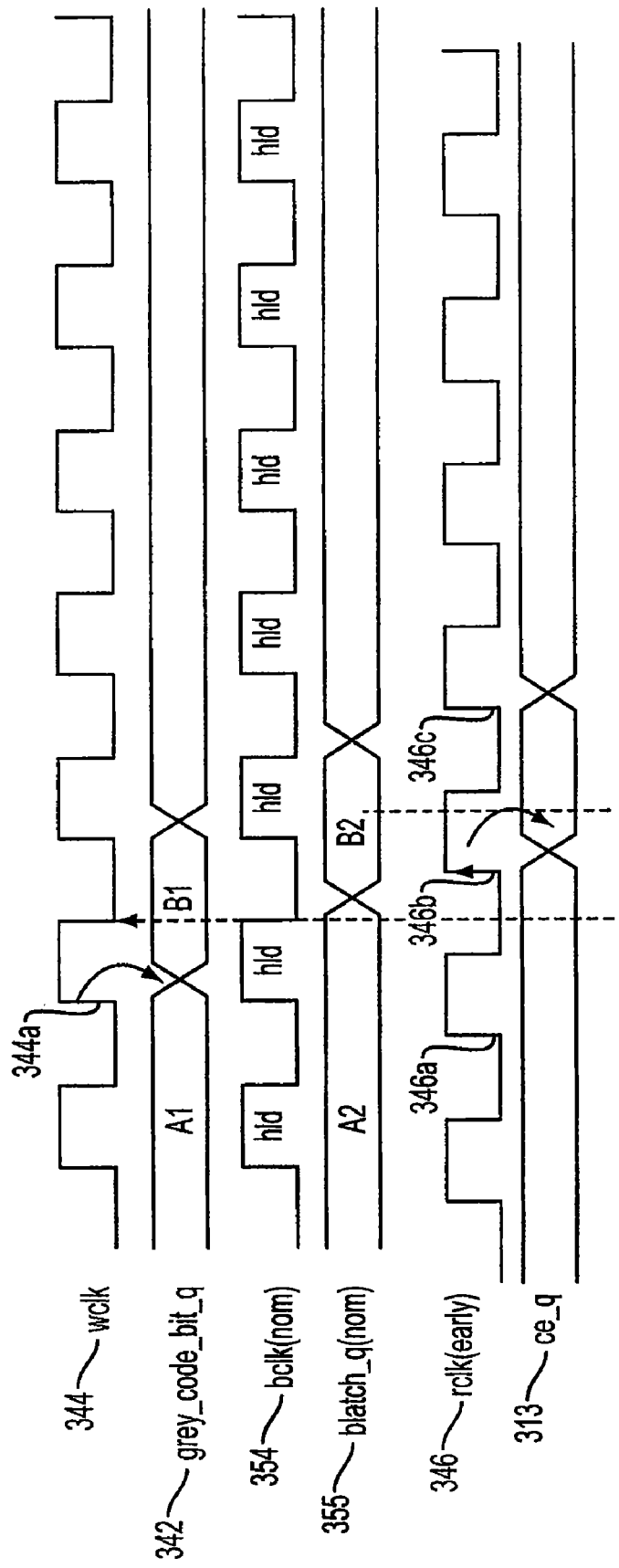
FIG. 4B is another timing diagram illustrating another possible timing relationship between the write clock and the read clock.
Figure 4C:
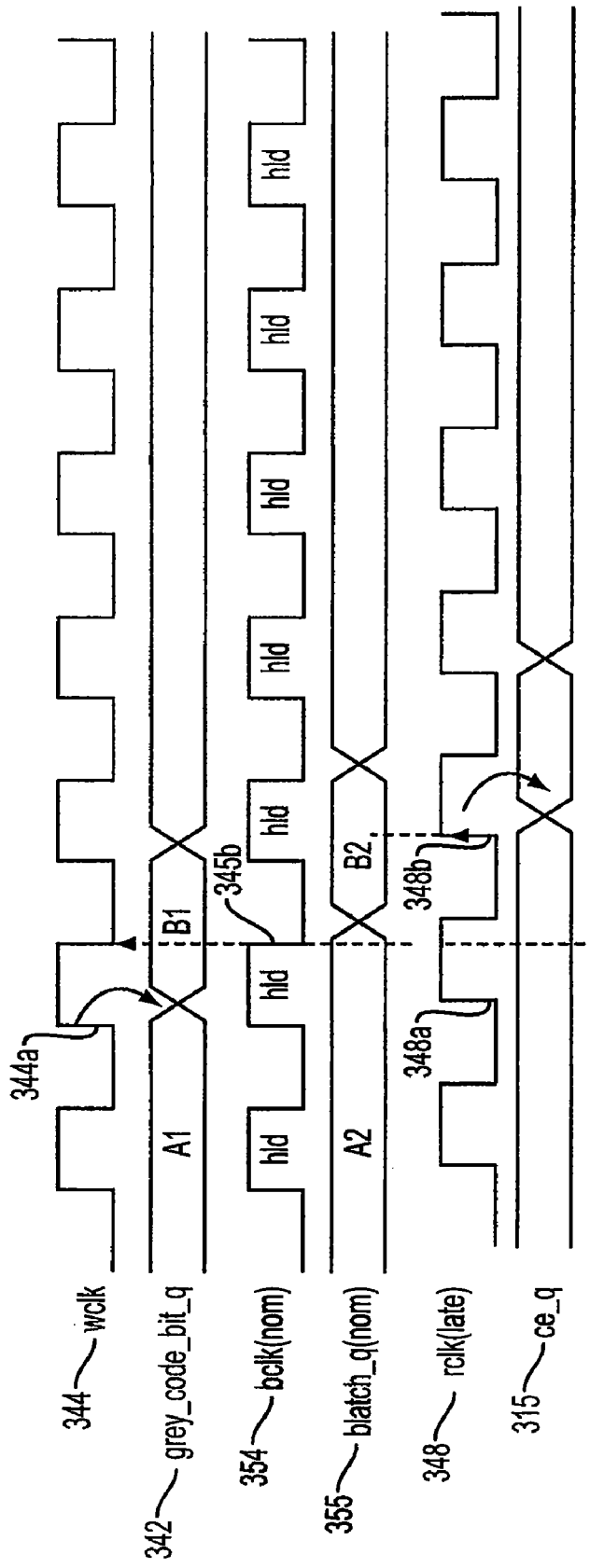
FIG. 4C is another timing diagram illustrating yet another possible timing relationship between the write clock and the read clock.

Continuing the description of this embodiment, FIGS. 4A, 4B and 4C are timing diagrams illustrating three of the possible relationships of the timing between the write clock signal 344 and the read clock signal 345. FIGS. 4A, 4B and 4C generally illustrate how the alignment of the write clock signal 344 and the read clock signal 345 affect the transmission of data from the write grid of the sync_cell 300 to the read grid of the sync_cell 300. Accordingly, an example of each of the timing relationships between the write clock signal 344 and the read clock signal 345 (where the write clock and the read clock may have the same frequency) will be discussed in further detail below.

For example, FIG. 4A is a timing diagram illustrating one possible relationship of the write clock signal 344 with respect to the read clock signal 345. As depicted in FIG. 4A, the write clock signal 344 (wclk) and the read clock signal 345 (rclk) may be the same frequency and the clock signals may be aligned. In this example, on the rising edge 344a of the write clock signal 344 (wclk), the data value 342 (grey_code_bit q) may change in the write flip-flop 340 from data state A1 to data state B1 in FIG. 4A. Additionally, the b-latch 350 may hold the b-latch data state 355 at a data state A2 when the b-latch clock signal 354 is high. The b-latch 350 may be transparent or allow the b-latch data value 355 to change when the b-latch clock signal 354 (bclk) is low and/or on the falling edge of the b-latch clock signal 354. When the b-latch clock signal 354 (bclk) is low, the b-latch 350 may allow the b-latch data value 355 (blatch_q) to change and/or transition from data state A2 to data state B2. Accordingly, the b-latch 350 may compensate for write and read clock signal mismatches on clock grids of up to half of a clock cycle because the b-latch may hold the output of the write flip-flop until the write flip-flop goes low.

Additionally, as shown in FIG. 4A, the clock enable data value 311 (ce_q) may be allowed to change on the rising edge 345*a* of the read clock signal 345 (rclk). After the clock enable data value 311 (ce_q) transitions from data state A3 to data state B3 on the rising edge 345*a*, the data may be transmitted to the first read flip-flop 310 on the rising edge 345*b* of the read clock signal 345 (rclk). Once the data is received on the input of the first read flip-flop 310 on the rising edge 345*b* of the read clock signal 345 (rclk) the data may change in the first read flip-flop 310. Accordingly, the first read flip-flop 310 may provide a synchronized data value 312 (sync'ed grey_code_bit_q).

FIG. 4B is a timing diagram illustrating another possible relationship between timing of the write clock signal 344 (wclk) and the read clock signal 346 (rclk). In FIG. 4B, the write and read clock signals, 344 and 346 respectively, may be the same frequency and the read clock signal 346 (rclk) may be early with respect to the write clock signal 344 (wclk) and thus be misaligned. Similar to FIG. 4A, in FIG. 4B, data value 342 (grey_code_bit q) may change in the write flip-flop 340 from data state A1 to data state B1 on the rising edge 344*a* of the write clock signal 344 (wclk). Further, the b-latch 350 of FIG. 4B may hold the b-latch data value 355 (blatch_q) when the b-latch clock signal 354 (bclk) is high and the b-latch 350 may be transparent when the b-latch clock signal 354 (bclk) is low. The b-latch clock signal 354 (bclk) may be transparent and/or allow the b-latch data value 355 (blatch_q) to change on the falling edge 354*b* of the b-latch clock signal 354 (bclk). Accordingly, when the b-latch clock signal 354 (bclk) is low, the b-latch 350 may allow the b-latch data value 355 (blatch_q) to change. For example, as shown in FIG. 4B the b-latch data value 355 (blatch_Q) may change from data state A2 to data state B2 on the falling edge 354B of the b-latch clock signal 354 (bclk).

Additionally, as shown in FIG. 4B, the read clock signal 346 (rclk) may be early with respect to the write clock signal 344 (wclk). In this timing diagram, the rising edge 346*a* of the read clock signal 346 (rclk) may be before the corresponding rising edge 344*a* of the write clock signal 344 (wclk), thus when the b-latch data value 355 (blatch_q) transitions from data state A2 to data state B2, the read clock signal 346 (rclk) is low. On the next rising edge 346*b* of the read clock signal 346 (rclk), the clock enable data value 313 (ce_q) may allow the data to be transmitted to the second read flip-flop 320 of FIG. 3. Once the data is received on the input of the second read flip-flop 320, on the next rising edge 346*c* of the read clock signal 346 (rclk) the data may change in the first read flip-flop 310.

FIG. 4C is a timing diagram illustrating another possible relationship of the write clock signal 344 (wclk) and the read clock signal 348 (rclk). In FIG. 4C, the write and read clock signals, 344 and 348 respectively, may be the same frequency and the read clock signal 348 (rclk) may be delayed with respect to the write clock signal 344 (wclk) and thus be misaligned. Similar to FIG. 4A, on the rising edge 344*a* of the write clock signal 344 (wclk) in FIG. 4C, the data value 342 (grey_code_bit q) may change in the write flip-flop 340 from data state A1 to data state B1. Further, the b-latch 350 of FIG. 4C may hold the data value when the b-latch clock signal 354 (bclk) is high and the b-latch 350 may be transparent and/or allow the b-latch data value (355) to change when the b-latch clock signal 354 (bclk) is low.

Additionally, as shown in FIG. 4C, the read clock signal 348 (rclk) may be delayed with respect to the write clock signal 344 (wclk). In this timing diagram, the rising edge 348*a* of the read clock signal 348 (rclk) may transition from a high signal to a low signal after the corresponding rising edge 344*a* of the write clock signal 344 (wclk), thus when the b-latch data value 355 (blatch_q) transitions from data state A2 to data state B2, the read clock signal 348 (rclk) may already be high. As discussed previously, the b-latch 350 may hold the data value and may delay the data value from changing until the b-latch clock signal 354 (bclk) goes low. In this way, the b-latch 350 may prevent the data from being incorrectly and immediately passed from the write side of the sync_cell 300 to the read side of the sync_cell 300 on the wrong clock signal.

As depicted in FIG. 4C, on the next rising edge 348*b* of the read clock signal 345 (rclk), the clock enable data value 315 (ce_q) may allow the data to be transmitted to the second read flip-flop 320. Once the data is received on the input of the second read flip-flop 320, on the next rising edge 348*c* of the read clock signal 348 (rclk) the data may change in the second read flip-flop 320. Accordingly, the first read flip-flop 310 may provide a synchronized data value.

Figure 5A:
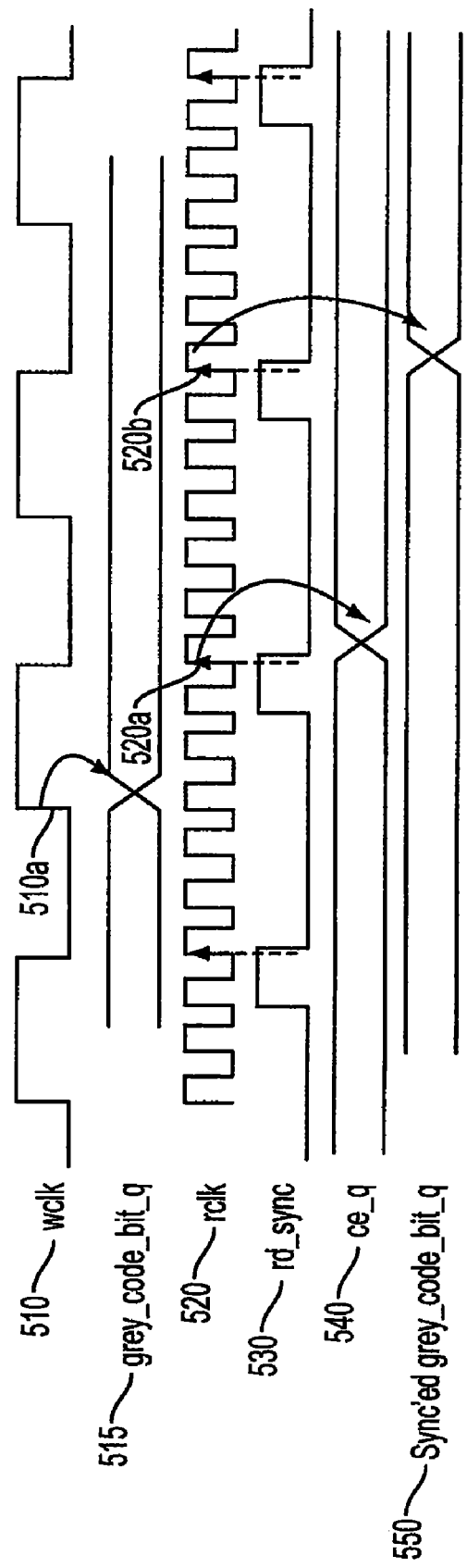
FIG. 5A is a timing diagram illustrating a timing relationship between the write clock and the read clock when the write clock and read clock may have different frequencies.

As previously discussed, FIGS. 4A, 4B and 4C illustrated the timing relationships between clock signals with the same frequency. It may be possible, however, for clock signals to have different frequencies. FIGS. 5A and 5B are provided as an example of synchronous data transmission in a system with clocks with different frequencies. In FIG. 5A, the write and read clock signals 510 and 520 respectively, may not have the same frequency. Generally, clusters may operate at different frequencies and the global clock may provide, for example, a divided down clock signal to the cluster. Because the divided down clock signal may originate from the phase locked loop PLL core, the divided down clock signal may be matched to the clock signals that are not altered before transmission.

In FIG. 5A, the clock signal 510 (wclk) has a lower frequency and/or has a slower clock signal than the read clock signal 520 (rclk). The data value 515 (grey_code_bit) may change on the rising edge 510*a* of the write clock signal 510 (wclk). FIG. 5A also includes a synchronization signal 530 (rd_sync), which may be generated to synchronize the data between the write side and the read side of the sync_cell 300 of FIG. 3. Generally, a synchronization pulse such as 530*a* may be asserted for one of the read clock signal 520 (rclk) cycles and after the rising edge 510*a* of the write clock signal 510 (wclk). After the data value 515 (grey_code_bit) changes value when the write clock signal 510 (wclk) is high, the rd_sync also may be high, which may allow the read clock signal 520 (rclk) to allow the clock enable data value 540 (ce_q) to change on the rising edge 520*a* of the read clock signal 520 (rclk). The clock enable data value 540 (ce_q) may allow the data to be transmitted to the second read flip-flop 320 of FIG. 3. Once the data is received on the input of the second read flip-flop 320, on another rising edge 520*b* of the read clock signal 520 (rclk) the data may change in the second read flip-flop 320. Accordingly, the first read flip-flop 310 may provide a synchronized data value 550 (sync'ed grey_code_bit_q).

Figure 6:
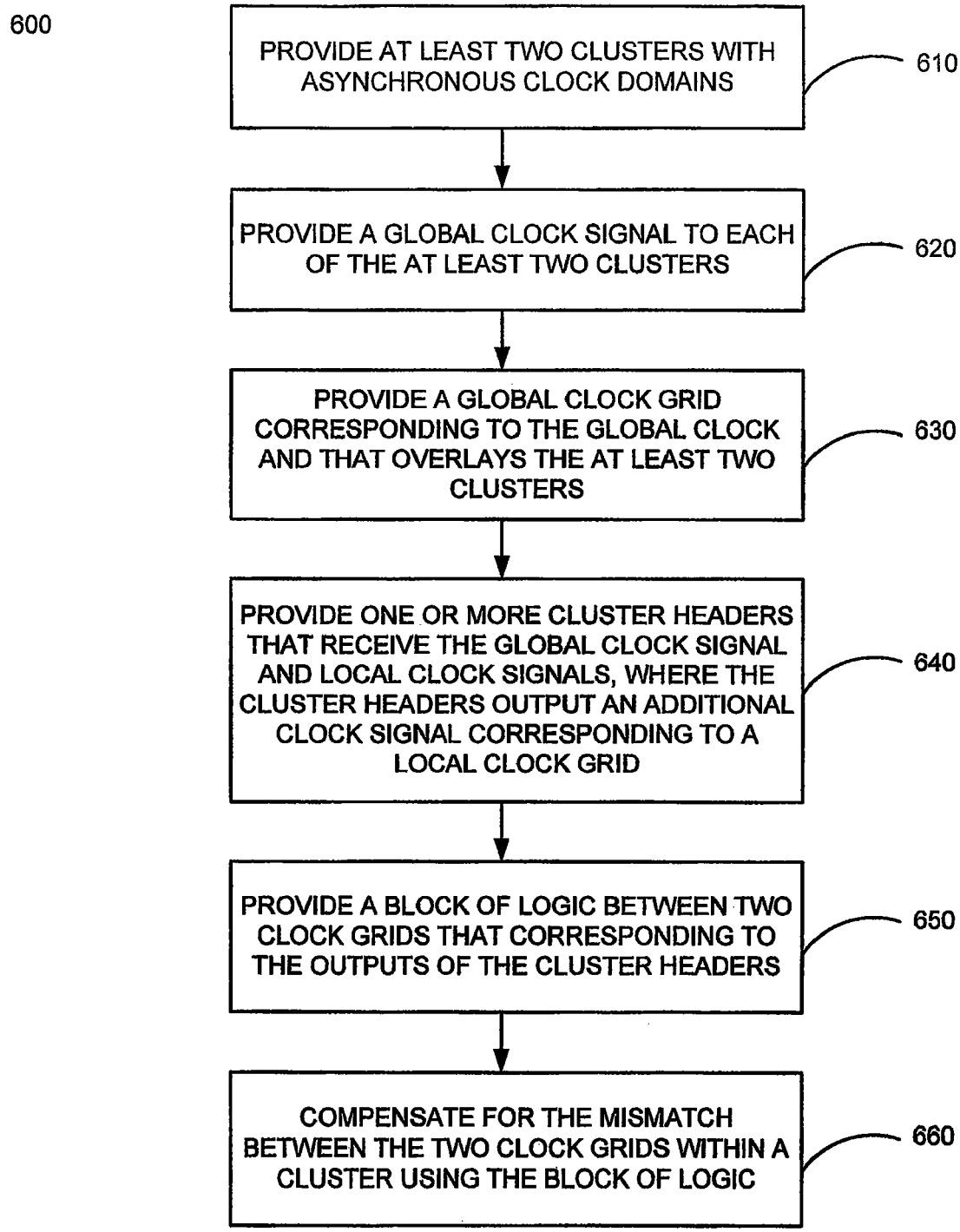
FIG. 6 is a flowchart of an embodiment for synchronizing the transfer of data employing a global clock grid.

FIG. 6 is a flowchart generally describing operations of one embodiment of a method 600 for allowing the synchronous operation between clusters which may have asynchronous clock domains. In the operation of block 610, at least two clusters with asynchronous clock domains may be provided in a system. The two clusters may receive clock signals from local clocks that may be mismatched in some form. The clusters may each receive the local clock signals via cluster headers as previously discussed. Additionally, a local clock grid may allow the transmission of the local clock signal to the corresponding cluster. In the operation of block 620, a global clock signal may be provided to each of the clusters in addition to the local clock signals. The global clock may also be received via the cluster headers of each of the clusters as previously discussed. In the operation of block 630, a global clock grid corresponding to the global clock may overlay the clusters. Further, the global clock grid may overlay the entire system. The global clock grid may allow the transmission of the global clock signal, that may be substantially aligned with respect to itself, to each cluster in the system. Generally, the clock signal may be distributed by a clock tree, grid and so on.

In the operation of block 640, one or more cluster headers may each receive a global clock signal and also may receive local clock signals. The cluster header may output a clock signal that may be provided to the cluster via a local clock grid. For example, a first cluster header and a second cluster header may both receive a first local clock signal and may both receive a global clock signal. The second cluster header, additionally, may have a second cluster header that receives a second local clock signal and the global clock signal. Therefore, the second cluster header may include two clock grids, a first clock grid that corresponds to the output clock signal of the first cluster header and a second clock grid that corresponds to the output clock signal of the second cluster header. Further, the first and second clock grids may be mismatched.

In the operation of block 650, a block of logic may be provided between the two clock grids corresponding to the outputs of the first cluster header and the second cluster header. The block of logic may be the sync_cell 300 as discussed with respect to FIG. 3. The block of logic may be part of a cluster as shown in FIG. 1 and may receive and synchronize the data transmission between clusters. The synchronous data transmission between clusters with asynchronous clock domains was previously discussed with respect to FIGS. 1-5. Further, in the operation of block 660, the block of logic may compensate for the mismatch within a cluster between the two clocks grids corresponding to the first cluster header and the second cluster header. The block of logic may include elements as depicted and as discussed with respect to FIG. 3. Generally, the block of logic may have a flip-flop that allows data to change on a rising edge or a high clock signal and may also have a latch that holds data on a high clock signal and may allow data to change on a falling edge or a low clock signal.

Although the present invention has been described with respect to particular apparatuses, configurations, components, systems and methods of operation, it will be appreciated by those of ordinary skill in the art upon reading this disclosure that certain changes or modifications to the embodiments and/or their operations, as described herein, may be made without departing from the spirit or scope of the invention. Accordingly, the proper scope of the invention is defined by the appended claims. The various embodiments, operations, components and configurations disclosed herein are generally exemplary rather than limiting in scope.

The invention claimed is:

1. An electronic system comprising:
a set of logic blocks comprising at least a first logic block and a second logic block, wherein each of the first logic block and the second logic block include asynchronous clock domains;
a global clock providing a global clock signal;
a global clock routing mechanism corresponding to the global clock and overlaying the electronic system, wherein the global clock routing mechanism provides the global clock signal to the first logic block and the second logic block of the electronic system, further wherein the global clock routing mechanism is configured to provide a substantially matched global clock signal to the first logic block and the second logic block of the set of logic blocks; and
a first header corresponding to the first logic block receives a first clock signal and the global clock signal and generates a first output clock signal, wherein the first clock signal corresponds to a first asynchronous clock domain;
a second header corresponding to the second logic block receives a second clock signal and the global clock signal and generates a second output clock signal, wherein the second output clock signal corresponds to a second asynchronous clock domain, and wherein the first asynchronous clock domain and the second asynchronous clock domain are misaligned; and
a synchronizing logic block connected between the first header and the second header, wherein the synchronizing logic block:
receives a data value;
receives the first output clock signal and the second output clock signal;
aligns the first output clock signal and the second output clock signal; and
generates a synchronized data value for transmission between the first logic block and the second logic block-based on the first output clock signal and the second output clock signal.

2. The electronic system of claim 1 further comprising a plurality of headers, wherein each of the logic blocks of the set of logic blocks have at least one corresponding header, further wherein the global clock signal is provided to each header.

3. The electronic system of claim 2 further comprising a plurality of clocks provided to each header of the plurality of headers.

4. The electronic system of claim 3 further comprising a plurality of output clocks, wherein each output clock is provided by a corresponding header of the plurality of headers.

5. The electronic system of claim 4 wherein the global clock routing mechanism is a clock grid.

6. The electronic system of claim 5 further comprising a plurality of clock grids, each of the plurality of clock grids corresponding to individual logic blocks of the set of logic blocks.

7. The electronic system of claim 4 further comprising a plurality of clock routing mechanisms, each of the plurality of clock routing mechanisms corresponding on a one to one basis to individual output clocks of the plurality of output clocks.

8. The electronic system of claim 1 of wherein the synchronizing logic block is inserted between at least two clock grids of the plurality of clock routing mechanisms, wherein the two clock routing mechanisms are in the same logic block of the set of logic blocks.

9. The electronic system of claim 1 wherein the first header and the second header correspond to two clock routing mechanisms that may be mismatched.

10. The electronic system of claim 1 wherein the global clock routing mechanism further comprises transmission lines that connect the global clock to each logic block of the set of logic blocks.

11. The electronic system of claim 10 wherein the transmission lines of the global clock routing mechanism are configured to provide a matched global clock signal to each logic block of the set of logic blocks.

12. The electronic system of claim 1 further comprising a delay in the global clock signal between the global clock and a logic block of the set of logic blocks, that is less than half the period of a fastest clock signal of the electronic system, wherein the delay results from at least one delay element coupled between the global clock and the logic block of the set of logic blocks.

13. The electronic system of claim 1 further comprising a first clock routing mechanism of the first logic block of the set of logic blocks and a second clock routing mechanism of the second logic block of the set of logic blocks, wherein the first clock routing mechanism and the second clock routing mechanism are matched.

14. A method for synchronously transmitting data in a system with asynchronous clock domains and having at least first and second logic blocks, the method comprising:
   generating a global clock signal corresponding to a global clock, wherein the global clock signal is provided to the at least first and second logic blocks, further wherein a global clock routing mechanism having transmission lines transmits substantially matched global clock signals to the at least first and second logic blocks;
   receiving at least the global clock signal and an additional clock signal at one or more logic block headers, wherein the one or more logic block headers provide at least two asynchronous output clock signals corresponding to at least two output clock routing mechanisms;
   receiving the at least two asynchronous output clock signals at a synchronizing logic block located between the at least two output clock routing mechanisms;
   receiving a data value at the synchronizing logic block;
   aligning the at least two asynchronous output clock signals at the synchronizing logic block;
   generating a synchronized data value at the synchronizing logic block; and
   transmitting the synchronized data value between the at least first and second logic blocks.

15. The method of claim 14 wherein the at least two output clock signals are different frequencies from one another.

16. The method of claim 14 further comprising:
   providing a first logic block header of the first logic block, wherein the first logic block header receives a first clock signal and the global clock signal; and
   providing a second logic block header of the second logic block, wherein the second logic block header receives the first clock signal and the global clock signal.

* * * * *